(12) United States Patent
Kim et al.

(10) Patent No.: US 8,609,282 B2
(45) Date of Patent: Dec. 17, 2013

(54) ELECTRODE CONDUCTIVE MATERIAL, ELECTRODE MATERIAL INCLUDING THE CONDUCTIVE MATERIAL, AND ELECTRODE AND LITHIUM BATTERY EACH INCLUDING THE ELECTRODE MATERIAL

(75) Inventors: Deok-Hyun Kim, Yongin-si (KR); Jae-Myung Kim, Yongin-si (KR); Kyu-Nam Joo, Yongin-si (KR); So-Ra Lee, Yongin-si (KR); Jong-Hee Lee, Yongin-si (KR); Young-Su Kim, Yongin-si (KR); Gu-Hyun Chung, Yongin-si (KR); Beom-Kwon Kim, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 381 days.

(21) Appl. No.: 12/957,193

(22) Filed: Nov. 30, 2010

(65) Prior Publication Data

US 2011/0305956 A1  Dec. 15, 2011

(30) Foreign Application Priority Data

Jun. 11, 2010  (KR) .................. 10-2010-0055460

(51) Int. Cl.
 *H01M 4/13*  (2010.01)
(52) U.S. Cl.
 USPC .................. 429/231.1; 429/232; 429/231.8; 429/209; 429/231.95; 252/502; 252/500; 423/445 R; 423/446; 423/448; 423/445 B

(58) Field of Classification Search
 USPC .............. 429/232, 231.8, 209, 231.95, 231.1; 252/502, 500; 423/445 R, 446, 448, 423/445 B
 See application file for complete search history.

(56) References Cited

U.S. PATENT DOCUMENTS

| | | | |
|---|---|---|---|
| 4,248,909 A | | 2/1981 | Whittaker |
| 5,718,989 A | * | 2/1998 | Aoki et al. ............. 429/223 |
| 5,795,558 A | * | 8/1998 | Aoki et al. ............. 429/223 |
| 5,985,446 A | * | 11/1999 | Lagow .................. 423/445 R |
| 6,040,090 A | * | 3/2000 | Sunagawa et al. ...... 429/231.95 |
| 6,893,776 B2 | * | 5/2005 | Naruoka et al. ........ 429/231.1 |
| 2011/0086294 A1 | * | 4/2011 | Xiao et al. .............. 429/209 |

FOREIGN PATENT DOCUMENTS

| | | |
|---|---|---|
| CN | 1387271 A | 12/2002 |
| JP | 2005-085675 | 3/2005 |
| JP | 2005-243579 | 9/2005 |

(Continued)

OTHER PUBLICATIONS

Shiraishi et al. "Lithium ion doping and dedoping behavior of carbyne-like carbon film electrode", Chemistry Letters, vol. 34, No. 12, Department of Nano-Material Systems, Graduate School of Engineering, Gunma Univ. Japan, pp. 1673-1683. 2005.*

(Continued)

*Primary Examiner* — Laura Weiner
(74) *Attorney, Agent, or Firm* — Knobbe, Martens, Olson & Bear, LLP

(57) ABSTRACT

An electrode conductive material, an electrode material including the electrode conductive material, an electrode including the electrode material, and a lithium battery including the electrode material. When the electrode conductive material is used, the amount of a conductive material required is decreased, capacity of the lithium battery is improved, and a charge and discharge rate is increased.

5 Claims, 10 Drawing Sheets

DIAMOND

GRAPHITE

CARBYNE

(56) References Cited

FOREIGN PATENT DOCUMENTS

| | | |
|---|---|---|
| JP | 2008-091236 A | 4/2008 |
| KR | 10-2006-0010948 A | 2/2006 |
| KR | 10-2006-0106225 A | 10/2006 |
| KR | 10-2007-0109118 A | 11/2007 |
| KR | 10-2008-0058254 A | 6/2008 |
| KR | 10-0878718 B1 | 1/2009 |

OTHER PUBLICATIONS

Registration Determination Certificate issued by the Korean Intellectual Property Office dated Oct. 18, 2011, 5 pages.

* cited by examiner

DIAMOND

GRAPHITE

CARBYNE

ELECTRODE CONDUCTIVE MATERIAL, ELECTRODE MATERIAL INCLUDING THE CONDUCTIVE MATERIAL, AND ELECTRODE AND LITHIUM BATTERY EACH INCLUDING THE ELECTRODE MATERIAL

CROSS-REFERENCE TO RELATED APPLICATIONS

This application claims the benefit of Korean Patent Application No. 10-2010-0055460, filed on Jun. 11, 2010, in the Korean Intellectual Property Office, the disclosures of which are incorporated herein in their entirety by reference.

BACKGROUND

1. Field

One or more embodiments relate to an electrode conductive material, an electrode material, and an electrode and a lithium battery each including the electrode material.

2. Description of the Related Technology

Lithium secondary batteries have drawn attention as a power source of small, portable electronic devices. Since lithium secondary batteries contain an organic electrolyte solution, they have a discharge voltage that is at least two times that of general batteries including an aqueous alkali electrolyte, and thus have a higher energy density.

Lithium secondary batteries use a conductive material for allowing charges generated due to an electrochemical reaction between electrode active materials to migrate smoothly, and some lithium secondary batteries include a carbon black-based carbonaceous material as a conductive material. Since most positive active materials have poor conductivity, a positive electrode plate contains a conductive material. However, as for a negative electrode plate including a carbonaceous-based negative active material such as graphite, a conductive material is not used because the active material itself has high conductivity. However, recently developed high-performance lithium titanium oxide negative electrodes have poor conductivity and thus, about 5 to 10 weight % carbon black is used together therewith in the manufacturing process.

The increase in the amount of a conductive material for improving conductivity of electrode plates necessarily leads to a decrease in the amount of an electrode active material and thus, a battery capacity may be reduced. The present embodiments overcome the above problems as well as provide additional advantages.

SUMMARY

One or more embodiments include an electrode conductive material that improves conductivity of a positive or negative electrode plate of a lithium battery, contributes an increase in a capacity of a lithium battery, and improves a charge and discharge rate.

One or more embodiments include an electrode material including an electrode active material and the electrode conductive material.

One or more embodiments include an electrode including the electrode material.

One or more embodiments include a lithium battery including the electrode material.

Additional aspects will be set forth in part in the description which follows and, in part, will be apparent from the description, or may be learned by practice of the presented embodiments.

According to one or more embodiments, an electrode conductive material includes a carbonaceous material having a linear carbon chain.

According to one or more embodiments, an electrode material includes: an electrode active material; and an electrode conductive material including a carbonaceous material having a linear carbon chain.

According to one or more embodiments, an electrode includes the electrode material described above.

According to one or more embodiments, a lithium battery including an electrode comprising the electrode material described above.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
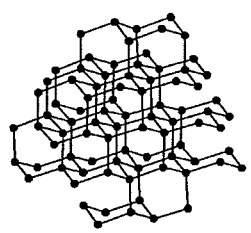
FIG. 1 is a diagram illustrating typical bonding structures of carbon.
Figure 1:
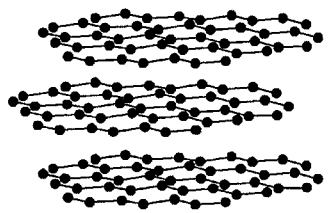
Figure 1:
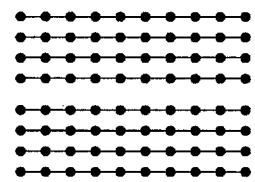

Reference will now be made to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Hereinafter, embodiments of an electrode conductive material, an electrode material, an electrode including the electrode material, and a lithium battery including the electrode will be described.

Carbon has various chemically stable crystal structures at room temperature. FIG. 1 is a diagram illustrating typical crystal structures of carbon. Referring to FIG. 1, the typical crystal structures of carbon are diamond including sp3 bonds, graphite including sp2 bonds, and carbyne including sp1 bonds. Carbyne includes a linear carbon chain in which carbon bonds are in a thread form, and thus it has excellent conductivity and has a Young's modulus 40 times greater than that of diamond. For these reasons, carbyne has drawn much attention in the nanotechnology field. However, carbyne has a low heat-resistance temperature of about 250° C., and thus could not be widely used due to its poor stability at high temperatures.

The present embodiments use a small amount of a carbonaceous material including a linear carbon chain, such as carbyne, as an electrode conductive material of a lithium battery since lithium batteries are normally not operated at a temperature greater than 200° C. As a result, they found that the capacity and charge/discharge efficiency of the lithium battery are improved even with a small amount of the carbonaceous material, and thus the present embodiments are based on this improvement.

An electrode conductive material according to an embodiment includes a carbonaceous material having a linear carbon chain. In this regard, the linear carbon chain includes sp1 bonds, and an example of the carbonaceous material having such a bonding structure is carbyne.

Due to the linear chain structure, the carbonaceous material described above, which is in a thread form, has higher conductivity than a conventional conductive material. In addition, even when a small amount of the conductive material is used, desired effects may be sufficiently obtained. Thus, when the carbonaceous material having such a bonding structure is used as a conductive material in manufacturing an electrode of a lithium battery, the amount of the conductive material required is reduced, and the amount of an electrode active material is increased. Thus, a high battery capacity may be obtained.

The electrode conductive material including the carbonaceous material may be used in both a positive electrode and a negative electrode. For example, in regard to a lithium battery using an electrode active material having high specific resistance and low electrical conductivity, use of the electrode conductive material leads to high conductivity of the electrode.

The electrode conductive material including the carbonaceous material may be coated on a surface of electrode active material or may be simply mixed with an electrode active material in order to prepare an electrode material of a lithium battery. In the case that the electrode conductive material is coated on a surface of electrode active material particles, since carbyne has high conductivity and easily forms conductive links, conductivity of an electrode including the electrode conductive material is substantially improved. Even when the electrode conductive material is simply mixed with an electrode active material without performing additional processes in consideration of cost due to the additional processes, substantially high conductivity may also be obtained compared to when a conventional conductive material is used.

The carbonaceous material having a linear carbon chain may be prepared by, for example, stirring a polymer such as polyvinylidene fluoride (PVDR) or polyvinyl chloride (PVC) in a base solvent, and drying and heat treating the resultant product. In order to coat the carbonaceous material on a surface of electrode active material particles, an electrode active material is added to the solution prepared by stirring the polymer in the base solvent, and then drying and heat treating are performed thereon.

The carbonaceous material and an electrode active material can be separately prepared, and the carbonaceous material may be particles having an almost round shape. Thus, when the carbonaceous material is used together with the electrode active material in manufacturing an electrode of a lithium battery, a packing density of the electrode may be increased. For example, an average diameter of the round carbonaceous material particles may be from about 20 to about 50 μm, and within this range, an electrode manufactured using the carbonaceous material and the electrode active material has high packing density and excellent capacity characteristics.

In addition, the carbonaceous material has a porous structure having a plurality of nano-sized pores, and the pores may be in various irregular forms. Due to the porous structure, a contact surface with respect to an electrolyte is increased. Thus, an electron pathway between the electrode active material and the electrolyte is shortened and an electrode reaction rate may be increased.

As described above, due to the inclusion of the carbonaceous material including a linear carbon chain, the electrode conductive material according to the present embodiment improves conductivity of the electrode. Thus, a decrease in capacity during high-rate charging and discharging is reduced. Also, since a space in which a conventional conductive material is used to occupy is filled with an electrode active material, a battery capacity may be increased.

An electrode material according to an embodiment includes an electrode active material; and the electrode conductive material including the carbonaceous material having a linear carbon chain described above.

The electrode active material included in the electrode material may be any positive or negative active material that is commonly used in the art. However, if the electrode active material is a material that has high specific resistance and low electrical conductivity, for example, a material having a specific resistance of $5 \times 10^7$ Ωm or more, use of the electrode conductive material may be effective.

When the electrode active material is a positive active material, a lithium transition metal oxide enabling reversible intercalation and deintercalation of lithium may be used. For example, the positive active material may include at least one kind of composite oxide selected from the group consisting of composite oxides of lithium and metal such as, for example, cobalt (Co), manganese (Mn), nickel (Ni), iron (Fe), and a combination thereof. Such a positive active material may be a compound represented by any one formula selected from the group consisting of $Li_aA_{1-b}B_bD_2$ where $0.90 \le a \le 1.8$ and $0 \le b \le 0.5$; $Li_aE_{1-b}B_bO_{2-c}D_c$ where $0.90 \le a \le 1.8$, $0 \le b \le 0.5$, and $0 \le c \le 0.05$; $LiE_{2-b}B_bO_{4-c}D_c$ where $0.90 \le b \le 0.5$ and $0 \le c \le 0.05$; $Li_aNi_{1-b-c}Co_bB_cD_\alpha$ where $0.90 \le a \le 1.8$, $0 \le b \le 0.5$, $0 \le c \le 0.05$, and $0 < \alpha \le 2$; $Li_aNi_{1-b-c}Co_bB_cO_{2-\alpha}F_\alpha$ where $0.90 \le a \le 1.8$, $0 \le b \le 0.5$, $0 \le c \le 0.05$, and $0 < \alpha < 2$; $Li_aNi_{1-b-c}Mn_bB_cD_\alpha$ where $0.90 \le a \le 1.8$, $0 \le b \le 0.5$, $0 \le c \le 0.05$, and $0 < \alpha \le 2$; $Li_aNi_{1-b-c}Mn_bB_cO_{2-\alpha}F_\alpha$ where $0.90 \le a \le 1.8$, $0 \le b \le 0.5$, $0 \le c \le 0.05$, and $0 < \alpha < 2$; $Li_aNi_bE_cG_dO_2$ where $0.90 < a \le 1.8$, $0 \le b \le 0.9$, $0 \le c \le 0.5$, and $0.001 \le d \le 0.1$; $Li_aNi_bCo_cMn_dGeO_2$ where $0.90 \le a \le 1.8$, $0 \le b \le 0.9$, $0 \le c \le 0.5$, $0 \le d \le 0.5$, and $0.001 \le e \le 0.1$; $Li_aNiG_bO_2$ where $0.90 \le a \le 1.8$, and $0.001 \le b \le 0.1$; $Li_aCoG_bO_2$ where $0.90 \le a \le 1.8$ and $0.001 \le b \le 0.1$; $Li_aMnG_bO_2$ where $0.90 \le a \le 1.8$ and $0.001 \le b \le 0.1$; $Li_aMn_2G_bO_4$ where $0.90 \le a \le 1.8$ and $0.001 \le b \le 0.1$; $QO_2$; $QS_2$; $LiQS_2$; $V_2O_5$; $LiV_2O_5$; $LiIO_2$; $LiNiVO_4$; $Li_{(3-f)}J_2(PO_4)_3$ where $0 \le f \le 2$; $Li_{(3-f)}Fe_2(PO_4)_3$ where $0 \le f \le 2$; and $LiFePO_4$.

In the formulae above, A is selected from the group consisting of nickel (Ni), cobalt (Co), manganese (Mn), and combinations thereof; B is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof E is selected from the group consisting of cobalt (Co), manganese (Mn), and combinations thereof; F is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; I is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

The compounds listed above as positive active materials may have a surface coating layer (hereinafter, "coating layer"). Alternatively, a mixture of a compound without a coating layer and a compound having a coating layer, wherein the compounds are selected from the compounds listed above. The coating layer may include at least one compound of a coating element selected from the group consisting of oxide, hydroxide, oxyhydroxide, oxycarbonate, and hydroxycarbonate of the coating element. The compounds for the coating layer may be amorphous or crystalline. The coating element contained in the coating layer may be, for example, magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. A method of forming the coating layer may be any of various methods, for example, a spray coating method, an immersion method, and the like, as long as the method does not adversely affect the physical properties of the positive active material when a compound of such a coating element is used.

When the electrode active material is a negative active material, the negative active material may include at least one kind of material selected from the group consisting of lithium metal, metal alloyable with lithium, transition metal oxide, and a material that allows doping and undoping of lithium.

Examples of the metal alloyable with lithium include aluminum (Al), silicon (Si), tin (Sn), lead (Pb), zinc (Zn), bismuth (Bi), indium (In), magnesium (Mg), gallium (Ga), cadmium (Cd), silver (Ag), germanium (Ge), potassium (K), sodium (Na), calcium (Ca), strontium (Sr), barium (Ba), antimony (Sb), zinc (Zn), and titanium (Ti).

Examples of the transition metal oxide include a tungsten oxide, a molybdenum oxide, a titanium oxide, a lithium titanium oxide, a vanadium oxide, a lithium vanadium oxide, and the like.

Examples of the material that allows doping and undoping of lithium include silicon (Si); $SiO_x$ wherein $0<x<2$; an Si-T alloy wherein T is an alkali metal, an alkaline earth metal, a Group XIII element, a Group XIV element, a transition metal, a rare earth element, or combinations thereof (except for Si); Sn; $SnO_2$; and an Sn-T alloy wherein T is an alkali metal, an alkali earth metal, a Group XIII element, a Group XIV element, a transition metal, a rare earth element, or a combination thereof (except for Sn), wherein at least one of these materials may be used in combination with $SiO_2$ or a carbonaceous negative active material such as graphite. T may be magnesium (Mg), calcium (Ca), strontium (Sr), barium (Ba), scandium (Sc), yttrium (Y), titanium (Ti), zirconium (Zr), hafnium (Hf), vanadium (V), niobium (Nb), tantalum (Ta), chromium (Cr), molybdenum (Mo), tungsten (W), rhenium (Re), iron (Fe), lead (Pb), ruthenium (Ru), osmium (Os), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), antimony (Sb), bismuth (Bi), sulfur (S), selenium (Se), tellurium (Te), or combinations thereof.

The electrode conductive material used in the electrode material includes the carbonaceous material having a linear carbon chain, and in this regard, the linear carbon chain includes sp1 bonds, and an example of the carbonaceous material having such a bonding structure is carbyne. The electrode conductive material may be coated on a surface of electrode active material particles of the electrode active material or may be simply mixed with the electrode active material.

In order to improve conductivity of the electrode, the amount of the electrode conductive material used may be in from about 0.01 to about 30 wt % based on the total weight of the electrode material. The amount of the electrode conductive material may be appropriately controlled to be within a range in which conductivity of the electrode and battery capacity are improved. For example, when the amount of the electrode conductive material used is from about 0.01 to about 5 wt % based on the total weight of the electrode material, results are advantageous.

An electrode according to an embodiment may include the electrode material. The electrode may be used as an electrode for a lithium battery, and according to the kind of the electrode active material included in the electrode material, the electrode may be used as either a positive or negative electrode of a lithium battery, or for both positive and negative electrodes of a lithium battery.

The electrode may be manufactured by mixing the electrode material and a binder in a solvent to prepare an electrode composition, and then forming the electrode composition in a certain shape or coating a current collector such as a copper foil with the electrode composition.

The binder facilitates binding between the electrode active material and the conductive material, and binding of the electrode active material to the current collector. The amount of the binder may be from about 1 to about 50 parts by weight based on 100 parts by weight of the total weight of the electrode active material. Examples of the binder include polyvinylidene fluoride (PVDF), polyvinyl alcohols, carboxymethylcellulose (CMC), starch, hydroxypropylcellulose, regenerated cellulose, polyvinylpyrollidone, tetrafluoroethylene, polyethylene, polypropylene, ethylene-propylene-diene terpolymer (EPDM), sulfonated EPDM, styrene butadiene rubber, fluoro rubber, and various copolymers.

Examples of the solvent include N-methylpyrrolidone (NMP), acetone, water, and the like. The amount of the solvent may be from about 1 to about 10 parts by weight based on 100 parts by weight of the electrode active material. When the amount of the solvent is within this range, a process for forming the electrode active material layer may be facilitated.

In addition, the current collector is generally fabricated to have a thickness of about 3 to about 500 μM. The current collector is not particularly limited, and may be any of various materials so long as it has suitable conductivity without causing chemical changes in a fabricated battery. Examples of the current collector include copper, stainless steel, aluminum, nickel, titanium, sintered carbon, copper or stainless steel that is surface-treated with carbon, nickel, titanium or silver, and aluminum-cadmium alloys. In addition, the current collector may be processed to have fine irregularities on surfaces thereof so as to enhance its adhesive strength with respect to the electrode active material, and may be used in any of various forms including films, sheets, foils, nets, porous structures, foams, and non-woven fabrics.

The electrode composition may be coated directly on the current collector to manufacture an electrode plate. Alternatively, the electrode plate may be manufactured by casting the electrode composition on a separate support to form a film, separating the film from the support, and laminating the film on a copper foil current collector. The electrode is not limited to the examples described above, and may be one of a variety of types.

Alternatively, the electrode composition may be printed on a flexible electrode substrate to manufacture a printable battery.

A lithium battery according to an embodiment includes the electrode including the electrode material. For example, the lithium battery may be manufactured in the following manner.

A positive electrode and a negative electrode are fabricated by respectively coating a positive electrode composition and a negative electrode composition on current collectors and drying the resulting products. In this regard, at least one of the positive electrode and the negative electrode may include the electrode material, and may be manufactured according to the electrode manufacturing process described above.

The positive electrode and the negative electrode may be separated from each other by a separator. Any separator that is commonly used for lithium batteries may be used. For example, a separator that has low resistance to migration of ions in an electrolyte and has high electrolyte-retaining ability is suitable for use. Examples of the separator include glass fiber, polyester, polyethylene, polypropylene, polyfluoropolymer such as polytetrafluoroethylene (PTFE), and a combination thereof, each of which may be a nonwoven fabric or a woven fabric. The separator has a pore diameter of about 0.01 to about 10 μm and a thickness of about 5 to about 300 μm.

A lithium salt-including non-aqueous electrolyte is composed of a non-aqueous electrolyte solution and lithium. Examples of the non-aqueous electrolyte include a non-aqueous electrolyte solution, an organic solid electrolyte, and an inorganic solid electrolyte.

The non-aqueous electrolyte solution may be an aprotic organic solvent selected from the group consisting of N-methyl-2-pyrrolidone, propylene carbonate, ethylene carbonate (EC), butylene carbonate, dimethyl carbonate, diethyl carbonate (DEC), fluoroethylene carbonate (FEC), γ-butyrolactone, 1,2-dimethoxy ethane, tetrahydrofuran, 2-methyl tetrahydrofuran, dimethylsulfoxide, 1,3-dioxolane, formamide, dimethylformamide, acetonitrile, nitromethane, methyl formate, methyl acetate, phosphoric acid trimester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethylpropionate.

Examples of the organic solid electrolyte include polyethylene derivatives, polyethylene oxide derivatives, polypropylene oxide derivatives, phosphoric acid ester polymers, polyester sulfide, polyvinyl alcohols, polyvinylidene fluoride, and polymers including ionic dissociation groups.

Examples of the inorganic solid electrolyte include nitrides, halides, and sulfates of lithium such as $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be any lithium salt that is commonly used in a lithium battery, and that is soluble in the above-mentioned non-aqueous electrolyte. For example, the lithium salt may include at least one selected from the group consisting of $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, lower aliphatic carboxylic acid lithium, and lithium tetraphenyl borate.

Figure 2:
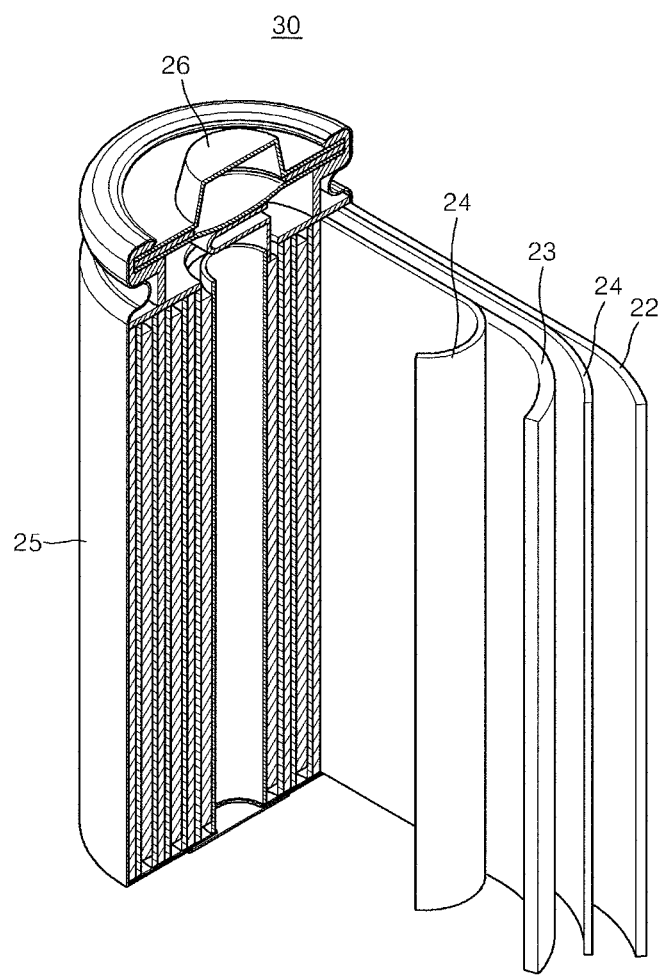
FIG. 2 is a schematic perspective view of a lithium battery according to an embodiment.

FIG. 2 is a schematic perspective view of a lithium battery 30 according to an embodiment.

Referring to FIG. 2, the lithium battery 30 includes a positive electrode 23, a negative electrode 22, and a separator 24 disposed between the positive electrode 23 and the negative electrode 22. The positive electrode 23, the negative electrode 22, and the separator 24 are wound or folded, and then accommodated in a battery case 25. Subsequently, an electrolyte is injected into the battery case 25 and the battery case 25 is sealed by a sealing member 26, thereby completing manufacturing of the lithium battery 30. The battery case 25 may have a cylindrical shape, a rectangular shape, or a thin-film shape. The lithium battery 30 may be a lithium ion battery.

In addition to functioning as power sources for conventional mobile phones and portable computers, the lithium battery may also be suitable for power tool requiring high capacity, high-power output, and operation under high temperature conditions, such as electric vehicles, and may be coupled to conventional internal combustion engines, fuel cells, or super-capacitors to be used in hybrid vehicles. Furtheiniore, the lithium battery may be used in all applications requiring high-power output, high voltage, and operation under high temperature conditions.

Hereinafter, examples of one or more embodiments will be described in detail with reference to the following examples. However, these examples are not intended to limit the scope of the one or more embodiments.

Synthesis of Carbyne

PREPARATION EXAMPLE 1

First, 300 ml of tetrahydrofuran (THF) as a solvent and 30 g of $CH_3OK$ as a base were heated at about 150° C. to prepare a solution in which the base was dissolved in the solvent. Next, 10 g of PVDR was added to the solution, and the resulting mixture was subjected to a synthesis reaction while being stirred at about 200° C. for about 3 to 5 hours. After completion of the synthesis reaction, the solution was filtered, and the remaining reactant was dried at 100° C. to remove the solvent and an organic material. The resulting product was washed with ethanol and distilled water and dried. In addition, an annealing process was performed on the resulting product at a temperature of about 900 to about 1,000° C., thereby completing synthesis of carbyne.

PREPARATION EXAMPLES 2 THROUGH 4

Carbynes were synthesized in the same manner as in Preparation Example 1, except that PVC, PE, and PP were respectively used instead of PVDR.

Figure 3:
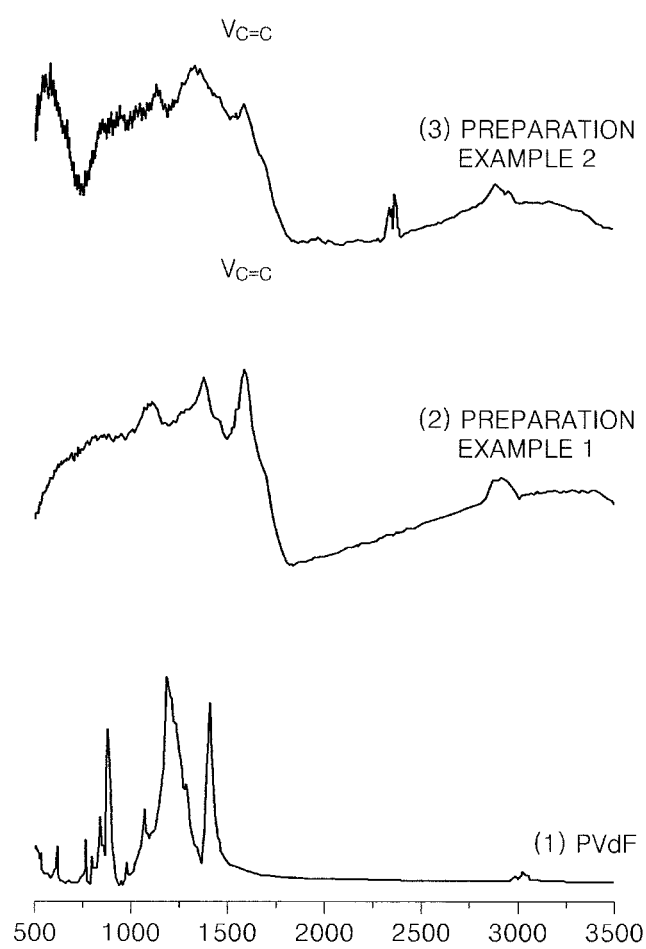
FIG. 3 illustrates graphs showing Fourier-Transform Infrared (FT-IR) spectroscopy results of carbynes synthesized according to Preparation Examples 1 and 2, and of polyvinylidene fluoride (PVDF) used as a raw material.

FIG. 3 illustrates graphs showing Fourier-Transform Infrared (FT-IR) spectroscopy results of the carbynes synthesized according to Preparation Examples 1 and 2. In FIG. 3, (1) shows FT-IR results of PVDR used as a raw material for synthesis, and (2) and (3) show FT-IR results of carbynes synthesized according to Preparation Examples 1 and 2. Referring to FIG. 3, in FT-IR spectroscopy of the negative active materials of Preparation Examples 1 and 2, it is confirmed that C═C and C≡C peaks are present at about 1,600 cm$^{-1}$ and 3,300 cm$^{-1}$, respectively, while the peaks are not present in the case of PVDR as a raw material, and these results show that carbynes were formed. The C=C peak is present since sp1 hybridized bonds are non-localized, and thus —C≡C— and =C=C= bonds are simultaneously found.

Figure 4:
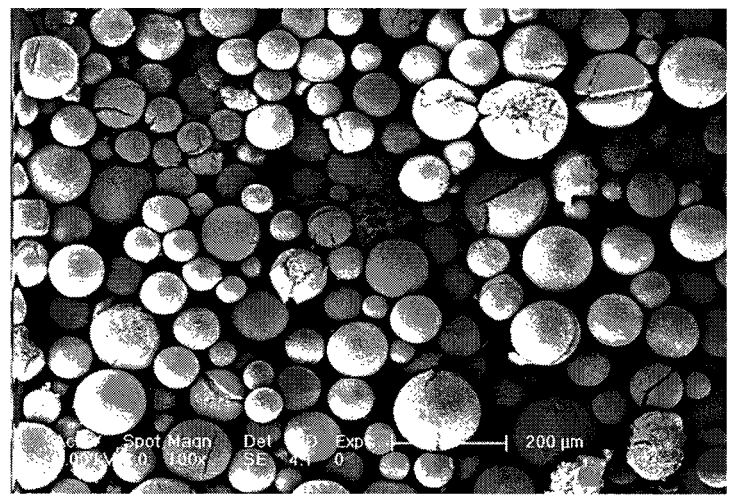
FIGS. 4 to 6 are scanning electron microscopic (SEM) images of carbyne prepared according to Preparation Example 1 at magnifications of 100×, 1,000×, and 30,000×, respectively.
Figure 5:
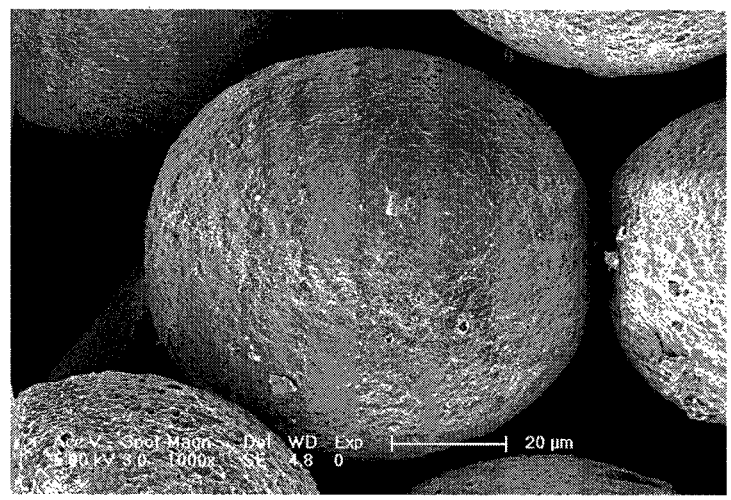
Figure 6:
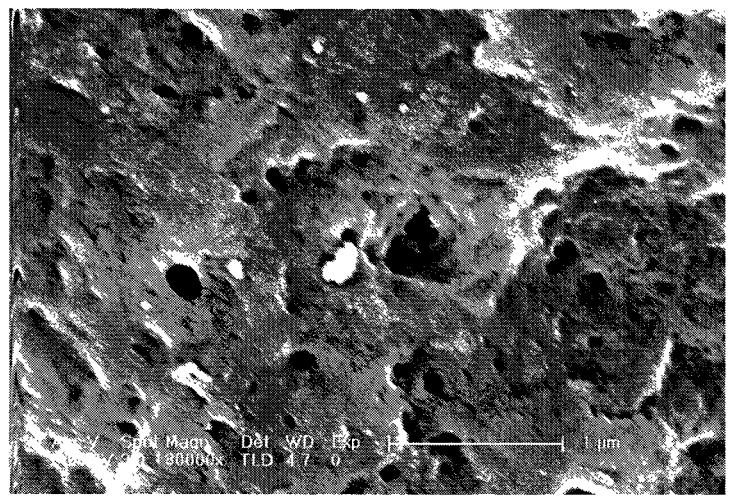

The carbyne synthesized according to Preparation Example 1 was observed using a scanning electron microscope (SEM) at magnifications of 100×, 1,000×, and 30,000×. The SEM images of the carbyne are respectively illustrated in FIGS. 4 to 6. Referring to FIGS. 4 and 5, the carbyne of Preparation Example 1 has an almost completely spherical shape. Referring to FIG. 6, the carbyne of Preparation Example 1 has a porous structure. Due to the porous structure, a contact surface of an electrode formed using the carbyne with respect to an electrolyte is increased and thus an electron pathway between an active material and the electrolyte may be reduced.

In addition, element distribution states of the carbyne of Preparation Example 1 were observed using energy dispersive X-ray spectroscopy (EDAX). The results are shown in Table 1 below.

TABLE 1

| Element | wt % | At % |
|---------|------|------|
| C | 73.37 | 82.18 |
| O | 16.86 | 14.18 |
| F | 0.78 | 0.55 |
| K | 8.99 | 3.09 |

EDAX observation results of PVDR used as a raw material are shown in Table 2 below.

TABLE 2

| Element | wt % | At % |
|---------|------|------|
| C | 41.72 | 53.10 |
| F | 58.28 | 46.90 |

Referring to Tables 1 and 2, it is confirmed that the carbyne of Preparation Example 1 contains an increased amount of carbon, due to the synthesis of carbyne, compared to PVDR.

Electrical Conductivity Characteristics Evaluation (1) Electrical Conductivity Evaluation of Carbyne In order to evaluate conductivity characteristics of the carbyne prepared according to Preparation Example 1, Denka Black, which is generally used as a conductive material, was used as a comparative example. The evaluation equipment used was MCP-PD51.

Figure 7:
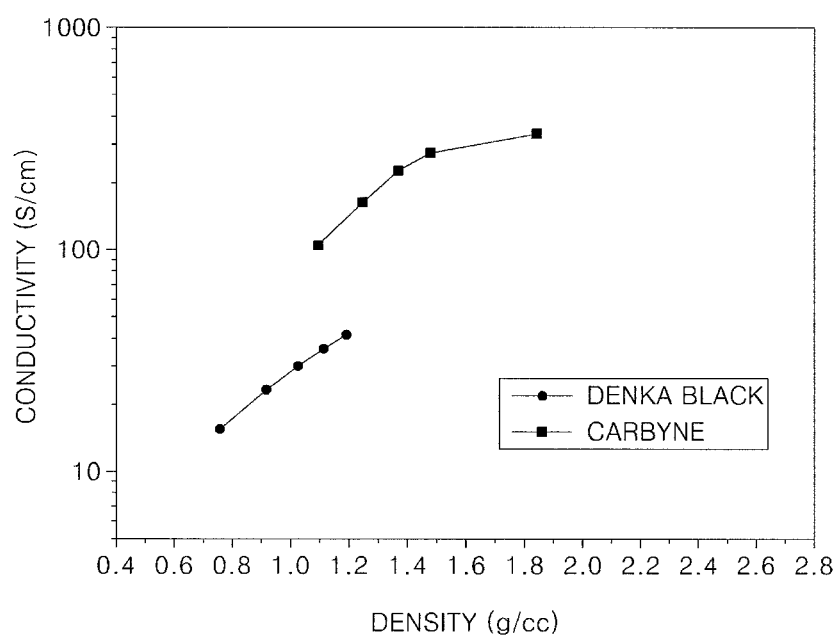
FIG. 7 is a graph of electrical conductivity of carbyne synthesized according to Preparation Example 1 and Denka Black.

Each of the carbyne prepared according to Preparation Example 1 and Denka Black was loaded into a holder, and then force of about 4 to about 20 kN or pressure of about 12 to about 63 Mpa was applied thereto. According to force of 20 kN, a thickness of pellets was from about 3 to 5 mm. A distance between electrodes was 3 mm, a radius of each of the electrodes was 0.7 mm, and a radius of pellets was 10 mm. At various levels of pressure, a resistance value (R) of a pattern was measured by using a four-point probe method. By using correction factors used to consider the thickness or shape of the pattern and the obtained resistance value, a specific resistance, and an electrical conductivity were evaluated and the results are shown in FIG. 7.

specific resistance measurement equation: $\rho = G \times R$, $G = 3.575 \times t$ ($\rho$: specific resistance, R: resistance value, G: shape correction factor, and t: pattern thickness)

$$\sigma = \frac{1}{\rho}$$

wherein $\sigma$ refers to electrical conductivity and $\rho$ refers to specific resistance Referring to FIG. 7, it can be seen that electrical conductivity of the carbyne prepared according to Preparation Example 1 is about 8 times higher than that of Denka Black.

(2) Electrical Conductivity Evaluation when Mixed with Negative Active Material

Each of the carbyne prepared according to Preparation Example 1 and Denka Black used as a comparative example was mixed with lithium titanium oxide (LTO, $Li_4Ti_5O_{12}$), which is being researched as a material for a high-performance negative electrode and electrical conductivities of the mixtures were measured. In this regard, the electrical conductivities were evaluated by using the same method as the above-mentioned method for evaluating electrical conductivity of carbyne, except that each of the carbyne and Denka Black was mixed with 5 wt % of LTO, and the results are shown in FIG. 8.

Figure 8:
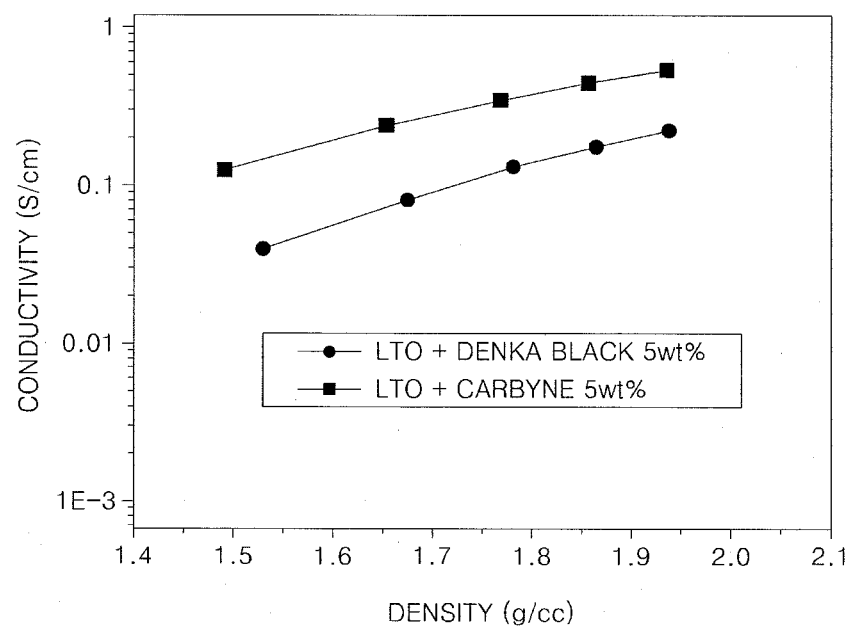
FIG. 8 is a graph of electrical conductivity of a mixture of lithium titanium oxide (LTO) and 5 wt % of carbyne, and a mixture of LTO and 5 wt % of Denka Black.

Referring to FIG. 8, electrical conductivity of the mixture of LTO and the carbyne was twice that the mixture of LTO and Denka Black that is a conventional conductive material.

Manufacture of Negative Electrode and Lithium Battery Including the Negative Electrode

EXAMPLE 1

3 wt % of Denka Black and 2 wt % of the carbyne of Preparation Example 1 were mixed with LTO to obtain a mixture. 5 g of the mixture and 0.35 g of a solution of 5 wt % of polyvinylidene fluoride (PVDF, KF1100, Kureha Chemical Industry Corporation, Japan) in N-methylpyrrolidone (NMP) were mixed to prepare a slurry. The slurry was coated on a Cu current collector to a thickness of about 50 μm using a doctor blade. Then, the resultant was dried at room temperature for 2 hours, and then dried again at 120° C. in a vacuum for 2 hours to manufacture a negative electrode plate.

The negative electrode plate, a lithium metal as a counter electrode, a polypropylene film as a separator, and an electrolyte solution obtained by dissolving 1.3 M of $LiPF_6$ in a mixture of ethylene carbonate (EC) and ethyl methyl carbonate (EMC) in a ratio of 3:7 (by volume) were used to manufacture a standard dimension coin cell.

EXAMPLE 2

A coin cell was manufactured in the same manner as in Example 1, except that the carbyne prepared according to Preparation Example 2 was used instead of the carbyne of Preparation Example 1.

EXAMPLE 3

A coin cell was manufactured in the same manner as in Example 1, except that 85 wt % of SiO, 5 wt % of the carbyne prepared according to Preparation Example 1, and 10 wt % of polyimide (PI) were mixed to prepare a mixture, and 5 g of the mixture was mixed with 0.35 g of N-methylpyrrolidone (NMP) to prepare a slurry, and a negative electrode plate was manufactured using the slurry.

COMPARATIVE EXAMPLE 1

A coin cell was manufactured in the same manner as in Example 1, except that the carbyne was not included and 5 wt % of Denka Black was used as the conductive material.

COMPARATIVE EXAMPLE 2

A coin cell was manufactured in the same manner as in Example 1, except that 70 wt % of SiO, 20 wt % of carbon black as the conductive material, and 10 wt % of PI were mixed to prepare a mixture and 5 g of the mixture was mixed with 0.35 g of NMP, and then a negative electrode plate was manufactured using the slurry.

EVALUATION EXAMPLE 1

Charge and Discharge Test

The coin cells manufactured according to Example 1 and Comparative Example 1 were charged at a current flow rate until the voltages thereof reached 0.001 V (with respect to Li), and then discharged at the same current flow rate until the voltages reached 1.5V (with respect to Li). The coin cells were each charged at a current rate of 0.01 C for the initial formation process. Then, the coin cells were each discharged with a constant current rate of 0.2 C (2 cycles), 0.5 C rate (2 cycles), 1 C rate (2 cycles), 2 C rate (2 cycles), 5 C rate (2 cycles) and 10 C rate (2 cycles) until the voltages of the cells reached 1.5 V with respect to the Li metal. The capacities of the coin cells at the discharging rates are shown in FIG. 9.

Figure 9:
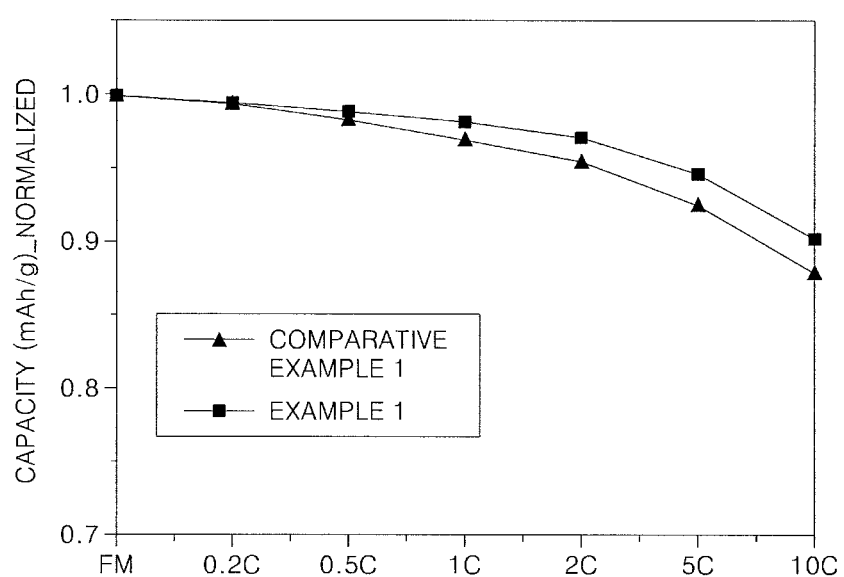
FIG. 9 is a graph of capacity with respect to a discharge rate of lithium batteries manufactured according to Example 1 and Comparative Example 1.

Referring to FIG. 9, a capacity reduction rate with respect to cycles of the lithium battery of Example 1 in which LTO is mixed with 3 wt % of Denka Black and 2 wt % of carbyne is smaller than that of the lithium battery of Comparative Example 1 in which LTO is mixed with 5 wt % of Denka Black.

Figure 10:
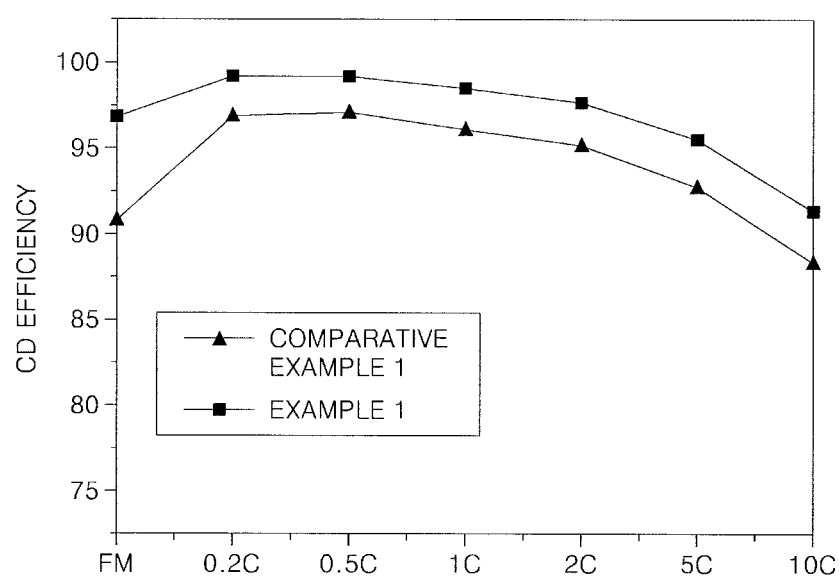
FIG. 10 is a graph of charge and discharge efficiency of lithium batteries manufactured according to Example 1 and Comparative Example 1.

In addition, charge and discharge efficiencies of the coin cells of Example 1 and Comparative Example 1 were measured and the results are shown in FIG. 10. Referring to FIG. 10, it can be seen that the lithium battery of Example 1 has higher charge and discharge efficiency than that of Comparative Example 1. It can also be seen that as the constant current rate is increased to 10 C, a decrease in capacity of the sample including carbyne is decreased. It can also be seen that the sample including 2 wt % of carbyne has higher charge and discharge efficiency than that of the sample including 5 wt % according to a rate.

The results show that use of carbyne as a conductive material leads to high conductivity and high-performance of a battery. Conventionally, as the constant current rate is increased, migration of lithium ions is very important. When carbyne is used as a conductive material, lithium ions migrate quickly.

Figure 11:
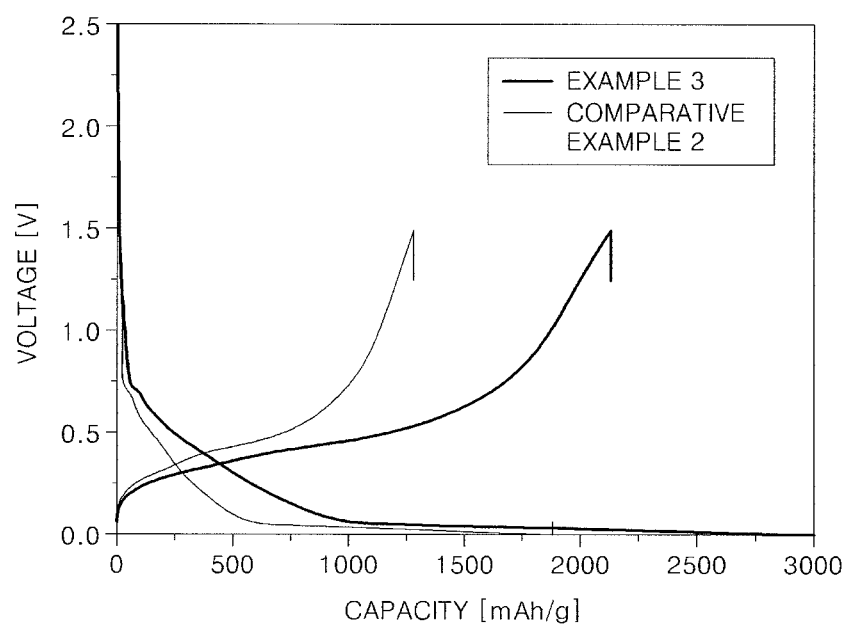
FIG. 11 is a graph showing charge-discharge test results of lithium batteries manufactured according to Example 3 and Comparative Example 2.

In order to evaluate capacity of a lithium battery including an Si-based negative electrode including carbon black and carbyne as a conductive material, the coin cells of Example 3 and Comparative Example 2 were repeatedly charged and discharged in the same conditions, and charge and discharge results for each coin cell with respect to a first cycle is shown in FIG. 11.

Referring to FIG. 11, discharge capacity of the coin cell of Comparative Example 2 is about 1250 mAh/g and discharge capacity of the coin cell of Example 3 is about 2130 mAh/g. That is, the discharge capacity of the coin cell of Example 3 is higher than the discharge capacity of the coin cell of Comparative Example 2. This is because due to high conductivity of carbyne, the amount of carbyne used was just one fourth of the equivalent amount of carbon black and the amount of the Si-based negative active material is increased correspondingly.

As described above, an electrode conductive material according to an embodiment includes a carbonaceous material that has high electrical conductivity and is easily synthesized. The electrode conductive material is used as a conductive material for a novel negative electrode material such as recently developed lithium titanium oxide (LTO) or a positive electrode material including lithium transition metal oxide. Since the electrode conductive material has high conductivity, when an electrode of a lithium battery includes the electrode conductive material, a decrease in capacity during charging and discharging at high current rate is reduced, and a capacity of a lithium battery is increased by decreasing the amount of the conductive material and by increasing the electrode active material.

It should be understood that the example embodiments described therein should be considered in a descriptive sense only and not for purposes of limitation. Descriptions of features or aspects within each embodiment should typically be considered as available for other similar features or aspects in other embodiments.

What is claimed is:

1. A positive electrode comprising:
    a positive active material comprising a lithium transition metal oxide; and
    a conductive material comprising a carbonaceous material having a linear carbon chain;
    wherein the linear carbon chain has a structure comprising sp1 bonds, and
    wherein the carbonaceous material comprises carbyne.

2. The positive electrode of claim 1, wherein an amount of the conductive material is from about 0.01 to about 30 wt % based on the total weight of an electrode material comprising the positive active material and the conductive material.

3. The positive electrode of claim 1, wherein the positive active material has a specific resistance equal to or higher than about $5 \times 10^7$ Ωm.

4. The positive electrode of claim 1, wherein the conductive material is coated on a surface of the positive active material.

5. A lithium battery comprising the positive electrode of claim 1.

* * * * *